United States Patent [19]
Pompei

[11] Patent Number: 6,064,129
[45] Date of Patent: May 16, 2000

[54] ELECTROMAGNETIC MOTOR AND ACTIVE VIBRATION-CONTROLLING APPARATUS INCLUDING AT LEAST ONE SUCH MOTOR

[75] Inventor: Michel Pompei, Villiers-sur-Orge, France

[73] Assignee: Hutchinson, Paris, France

[21] Appl. No.: 09/362,685

[22] Filed: Jul. 29, 1999

[30] Foreign Application Priority Data

Jul. 30, 1998 [FR] France .................................. 98 09760

[51] Int. Cl.[7] .................................................. H02K 41/00
[52] U.S. Cl. .............................. 310/12; 310/15; 318/611
[58] Field of Search .................................. 310/12, 15, 24, 310/34, 35, 81; 318/611

[56] References Cited

U.S. PATENT DOCUMENTS

| | | | |
|---|---|---|---|
| 3,924,730 | 12/1975 | Brown | 198/761 |
| 4,455,496 | 6/1984 | Dean et al. | 310/29 |
| 4,631,455 | 12/1986 | Taishoff | 318/37 |
| 4,669,711 | 6/1987 | Beer | 267/140.14 |
| 4,793,599 | 12/1988 | Ishioka | 267/140.14 |
| 4,874,998 | 10/1989 | Hollis, Jr. | 318/568.21 |
| 4,945,269 | 7/1990 | Kamm | 310/15 |
| 4,947,067 | 8/1990 | Habermann et al. | 310/51 |
| 5,036,930 | 8/1991 | Bisel et al. | 180/65.1 |
| 5,091,710 | 2/1992 | Ohba et al. | 335/229 |
| 5,453,675 | 9/1995 | Ushiyama et al. | 318/611 |
| 5,457,349 | 10/1995 | Gifford | 310/24 |
| 5,693,990 | 12/1997 | Miyazaki | 310/15 |

FOREIGN PATENT DOCUMENTS

| | | |
|---|---|---|
| 0 288 706 | 11/1988 | European Pat. Off. . |
| 0 509 911 | 10/1992 | European Pat. Off. . |
| 30 27 557 | 2/1982 | Germany . |
| WO 92/01876 | 2/1992 | WIPO . |

*Primary Examiner*—Nestor Ramirez
*Assistant Examiner*—Joseph Waks
*Attorney, Agent, or Firm*—Oblon, Spivak, McClelland, Maier & Neustadt, P.C.

[57] ABSTRACT

The present invention relates to an electromagnetic motor, in particular a linear motor, and to active vibration-control apparatus including at least one such motor. Said motor has a plurality of actuators, at least of which are disposed side by side and operate in alternation to exert forces in opposite directions.

9 Claims, 12 Drawing Sheets

ELECTROMAGNETIC MOTOR AND ACTIVE VIBRATION-CONTROLLING APPARATUS INCLUDING AT LEAST ONE SUCH MOTOR

The present invention relates mainly to an electromagnetic motor, in particular a linear motor, and to active vibration-controlling apparatus including at least one such motor.

BACKGROUND OF THE INVENTION

A linear motor can be implemented using at least one electromagnet attracting a pole plate. Two forces in opposite directions are obtained by such a motor, either by using an electromagnet that attracts a pole plate, thereby moving either the pole plate or the electromagnet in a first direction depending on whether one or the other one of them is movable, and resilient return means acting in the opposite direction, which solution is unsuitable if it is desired to be able to control displacement in both directions, or else by implementing a pair of electromagnets in alignment, each attracting a pole plate placed facing it. The second solution leads to linear motors of considerable length. In addition, such motors do not make it possible to provide displacements along a plurality of axes, and assembling such motors that extend along different axes leads to an assembly that is particularly complex and bulky.

The displacement of the pole plate or of the electromagnet, depending on which one of them is a moving part, can be used for transmission to some other mechanical member. Naturally, the moving part is held statically either by mechanical guidance or by a resilient suspension. If it is held by a resilient suspension, the mass of the moving part serves, beyond the natural frequency of the suspension, as a reaction point for injecting the force.

OBJECTS AND SUMMARY OF THE INVENTION

Consequently, an object of the present invention is to provide an electromagnetic motor that is short.

Another object of the present invention is to provide such a motor of a shape that enables it to be adapted to existing equipments and that can also be used as a vibrator for machines that vibrate.

Another object of the present invention is to provide such a linear motor.

Another object of the present invention is to provide such a motor that is suitable, on command, for implementing displacements along two or three orthogonal axes.

Another object of the present invention is to provide active vibration-controlling apparatus that is compact and effective.

These objects are achieved by a motor of the present invention of structure that makes it possible to avoid putting a plurality of electromagnetic actuators into alignment, typically coils or electromagnets.

In an advantageous variant, the electromagnetic actuators of the motor of the present invention have axes that are parallel in pairs.

BRIEF DESCRIPTION OF THE DRAWINGS

The invention will be better understood from the following description and the accompanying figures given as non-limiting examples, and in which.

MORE DETAILED DESCRIPTION

In FIGS. 2 to 16, the same references are used to designate the same elements.

Figure 1:
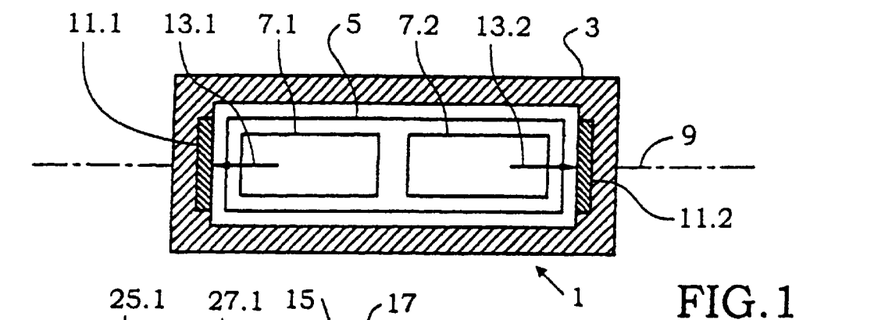
FIG. 1 is a diagrammatic section view of a motor of known type.

In FIG. 1, there can be seen a linear motor 1 of conventional type comprising, in a case or housing 3, moving equipment 5 forming an inertial mass having two electromagnets 7.1 and 7.2 mounted head to tail in line with each other and aligned on a common axis 9. On command, the electromagnet 7.1 attracts, i.e. when it is electrically powered it attracts a pole plate 11.1 secured to the housing 3 and facing the electromagnet 7.1. The attraction force causes the inertial mass 5 to move in the direction of arrow 13.1.

On command, the electromagnet 7.2 attracts, i.e. when it is electrically powered, it attracts a pole plate 11.2 secured to the housing 3 and facing said electromagnet 7.2. This attraction force causes the inertial mass 5 to move along arrow 13.2.

Figure 2:
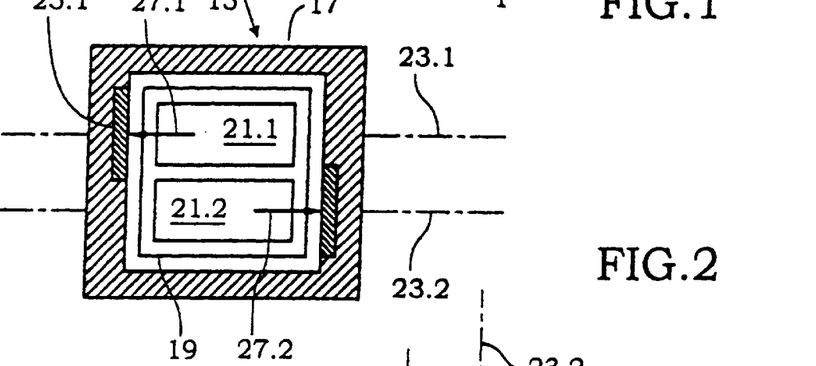
FIG. 2 is a diagrammatic section view of a first embodiment of a motor of the present invention.

In FIG. 2, there can be seen a first embodiment of an electromagnetic motor 15 of the present invention and comprising, mounted in a case or housing 17, moving equipment forming an inertial mass 19 that comprises two actuators 21.1 and 21.2 placed side by side. By way of example, the actuators 21.1 and 21.2 are of the electromagnet type or of the electromagnetic coil type. Advantageously, the two actuators 21.1 and 21.2 are disposed on two parallel axes 23.1 and 23.2. By being placed side by side, with their axes parallel, it is possible to reduce the length of the inertial mass 19, and consequently to reduce the overall size of the motor of the present invention. The two actuators 21.1 and 21.2 are placed in opposite directions, each being suitable for exerting action in a direction opposite to the other. A pole plate 25.1, typically a magnetic sheet of silicon steel, is secured to the housing 17 so as to face the actuator 21.1. When electricity is fed to the actuator 21.1, it causes the pole plate 25.1 to be attracted by said actuator, and consequently it causes the inertial mass 19 to be moved in the direction of arrow 27.1, thereby generating a force.

A pole plate 25.2, typically a magnetic sheet of silicon steel, is secured to the housing 17 facing the actuator 21.2. When electricity is fed to the actuator 21.2, it causes the pole plate 25.2 to be attracted by said actuator, consequently causing the inertial mass 19 to be moved in the direction of arrow 27.2, and thus generating a force.

In the absence of electrical feed to the actuators 21.1 and 21.2, the inertial mass 19 is not subjected to an electromagnetic force and it is held by suspension means (not shown).

The forces generated by the actuators 21.1 and 21.2 also generate a rotary torque on the inertial mass 19.

Figure 3:
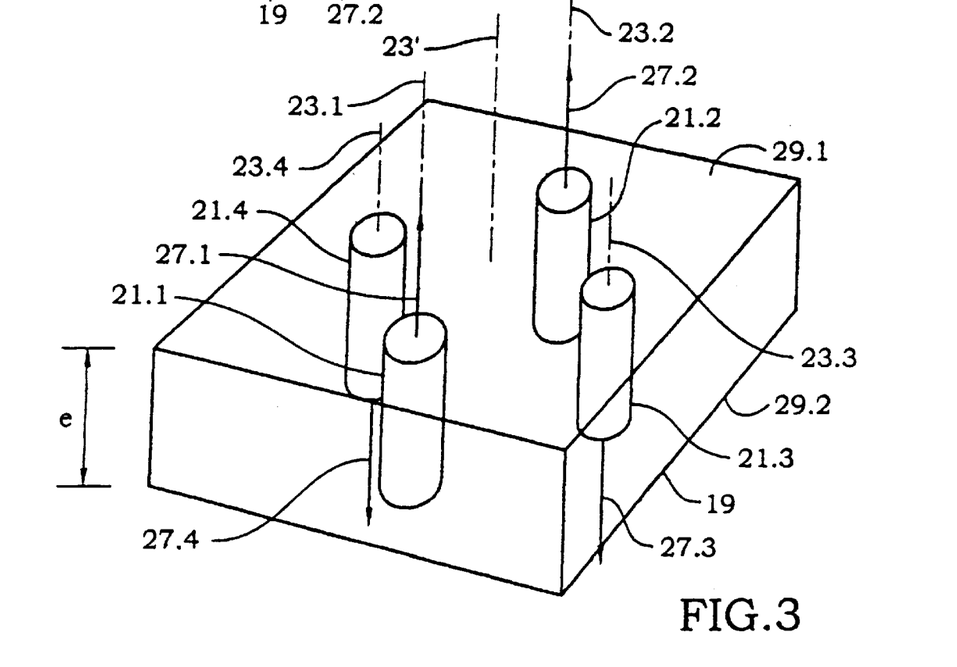
FIG. 3 is a diagrammatic perspective view showing the principle on which the preferred embodiment of a motor of the invention operates to provide displacement along a single axis.
Figure 4:
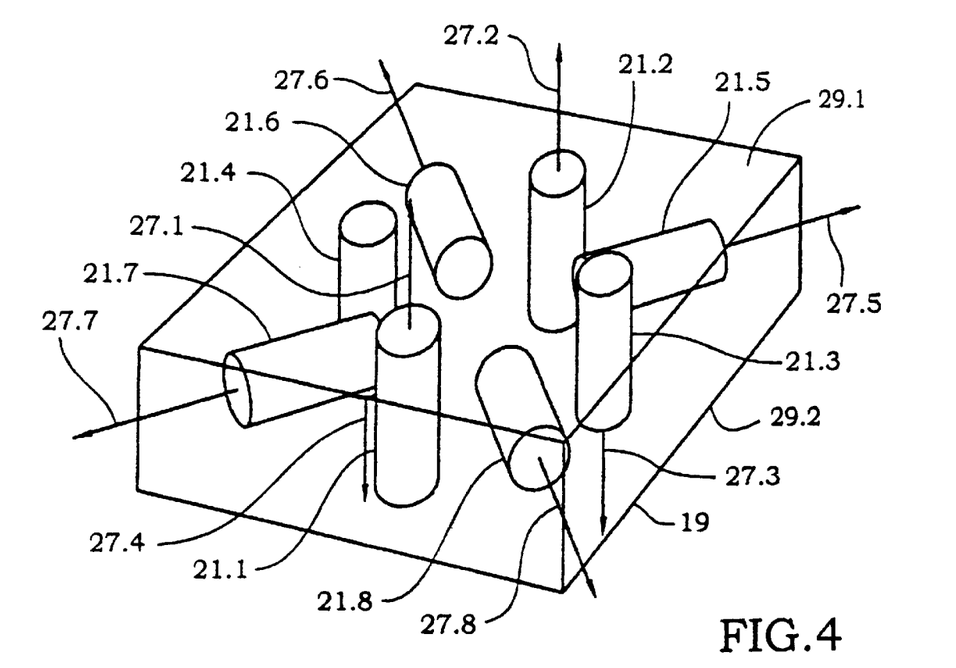
FIG. 4 is a similar view showing an embodiment of a motor suitable for moving, on command, along three orthogonal axes.

In contrast, in the embodiments shown in FIGS. 3 and 4, linear displacements are achieved without any rotary torque. In these figures, there can be seen only the inertial mass 19, it being understood that the corresponding pole plates are secured to a housing (not shown) facing the actuators.

The embodiment of FIG. 3 has four actuators: 21.1 on an axis 23.1; 21.2 on an axis 23.2; 21.3 on an axis 23.2; and 21.4 on an axis 23.4; which actuators are regularly spaced apart on the inertial mass 19, e.g. in the form of a rectangular parallelepiped. An axis passing through the center of gravity of the inertial mass 19 normally to its main faces 29.1 and 29.2 is referenced 23'. The axes 23.1, 23.2, 23.3, 23.4, and 23' are advantageously all parallel. The actuators disposed symmetrically relative to the axis 23' are advantageously oriented towards a single main face of the inertial mass 19, as illustrated by arrows 27.1 to 27.4 symbolizing the attractive forces exerted by the actuators 21.1 to 21.4. In the example shown, the actuators 21.1 and 21.2 face towards the top face 29.1, while the actuators 21.3 and 21.4 face towards the bottom face 29.2.

For any one direction, the actuators operating on said axis and in the same direction are disposed symmetrically about the working axis of the actuator so as to avoid generating a torque. The number N of actuators operating along any one axis and in the same direction is even, i.e. N=2m for m=1,2, . . . , and said actuators are disposed symmetrically about the working axis.

In a first embodiment, the thickness e of the inertial mass 19 is substantially equal to the height of the actuators 21.1 to 21.4. Under such circumstances, the actuators extend substantially over the entire thickness of the inertial mass 19. In a variant, the thickness e is greater than the length of the actuators 21.1 to 21.4. Under such circumstances, it is advantageous to move the actuators closer to the main face of the inertial mass 19 towards which each of them faces.

In FIG. 4, there can be seen an embodiment of an inertial mass 19 of the present invention that includes actuators enabling said inertial mass to be moved along three mutually perpendicular axes. In addition to the actuators 21.1 to 21.4, the inertial mass 19 has four actuators 21.5 to 21.8 that are aligned in pairs in opposite directions and that are located at half-thickness of the inertial mass 19, parallel to the diagonals of its main faces 29.1 and 29.2.

It should be observed that the actuators 21.6 and 21.8 are in alignment, as are the actuators 21.5 and 21.7 which can lead to the size of the inertial mass being increased. Nevertheless, this is more easily accepted in a motor that can operate along two or three orthogonal axes, since the additional actuators are received in the space that is left available between the actuators corresponding to the other axes.

Nevertheless, it should be understood that implementing four parallel-axis actuators (analogous to the actuators 21.1 to 21.4 of the inertial mass shown in FIG. 3) per displacement axis would not go beyond the ambit of the present invention. Under such circumstances, the inertial mass 19 could be in the form of a cube, for example, and would have twelve actuators that are regularly distributed relative to axes passing through the center of gravity of the inertial mass, but preferably offset so as to make maximum use of the volume available within the inertial mass.

Naturally, the motor of the present invention further includes means for feeding electricity to the actuators that are to be activated, resilient suspension means corresponding to the number of active axes, in particular leaf suspension means or, advantageously, omnidirectional suspension means made of elastomer together with optional sensors for sensing the position of the inertial mass 19 within the housing 17 so as to make servo-control possible, should that be desired.

Naturally, the present invention is not limited to the disposition of the actuators on the inertial mass, but also covers variant embodiments in which the actuators are secured to the housing 17 instead of and replacing the pole plates, the moving equipment formed by the inertial mass 19 carrying one or more pole plates that are attracted by the various magnets.

Figure 5:
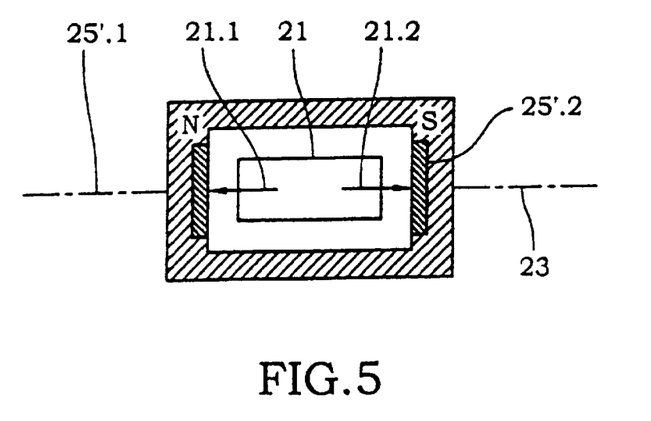
FIG. 5 is a diagrammatic section view of a variant embodiment of a motor of the present invention.

In FIG. 5, there can be seen a variant embodiment of the motor of the present invention in which the pole masses are replaced by permanent magnets 25'.1 and 25'.2 that are diametrically opposite on an axis 23 and that are polarized in opposite directions. A single actuator 21, e.g. a coil, is attracted by permanent magnet 25'.1 and repelled by permanent magnet 25'.2 as symbolized by arrow 21.1, or on the contrary is attracted by permanent magnet 25'.2 and is repelled by permanent magnet 25'.1 as represented by arrow 21.2, depending on the direction in which electricity flows in the coil.

Likewise, implementing actuators that exert a repulsion force instead of an attraction force does not go beyond the ambit of the present invention.

Figure 16:
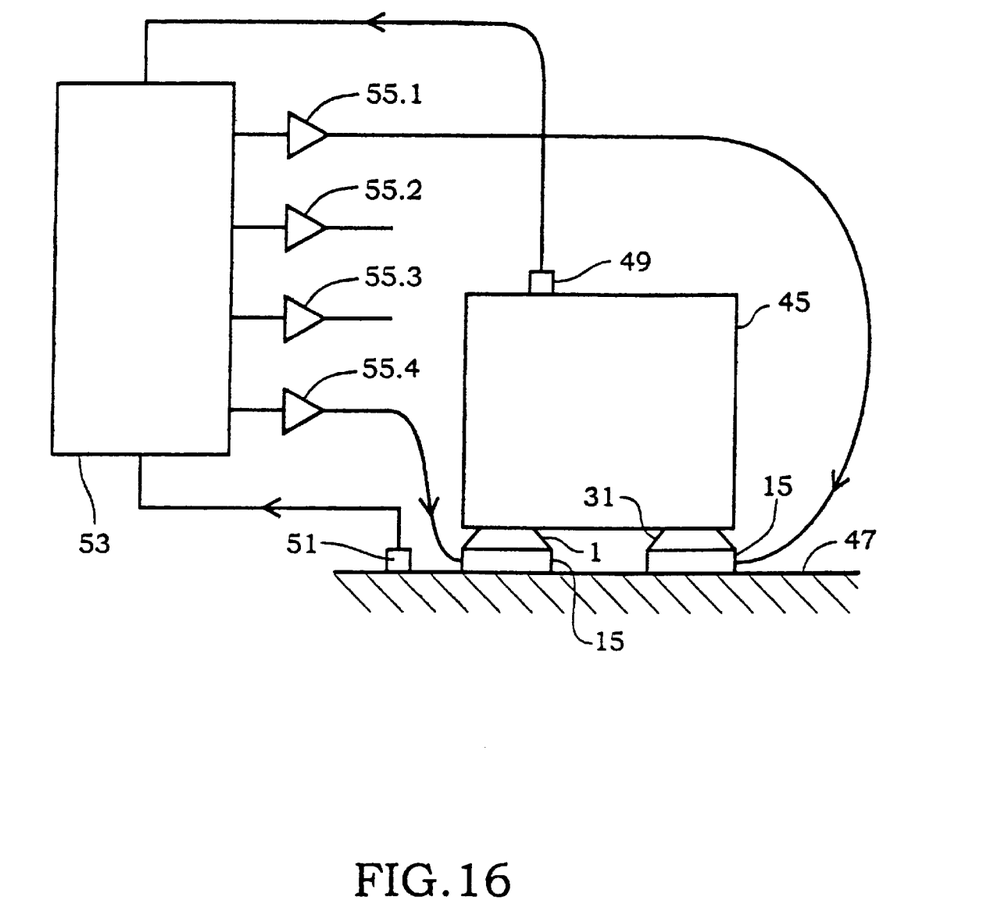
FIG. 16 is a theoretical diagram of active vibration control apparatus using four linear motors of the present invention.

In FIGS. 6 to 10, there can be seen a first preferred embodiment of a motor of the present invention suitable for operating along three perpendicular axes, the motor being housed in a compact low housing in the form of a rectangular parallelepiped having a square base. This shape of housing enables the motor of the present invention to be superposed with other devices, in particular with a stud 31 made of vibration-absorbing material, advantageously of an elastomer, e.g. natural rubber. A set of such studs can be used as a support for a machine that is liable to generate vibration, for example a rotary machine. Vibration is very highly attenuated by the studs 31. The motor of the present invention can be integrated in apparatus for actively controlling the residual vibration as transmitted by the stud 31, an example of which is shown in FIG. 16.

Figure 6:
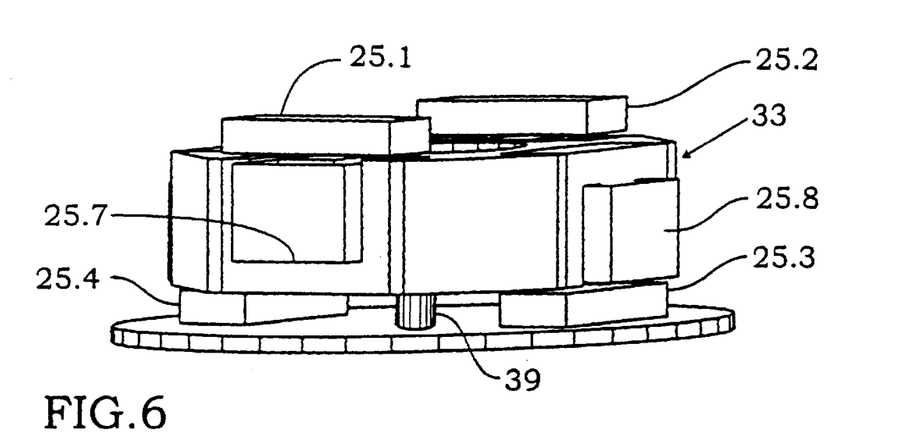
FIG. 6 is a perspective view of an embodiment of an actuator-carrier plate and of the associated pole plates of the FIG. 3 motor of the present invention.
Figure 7:
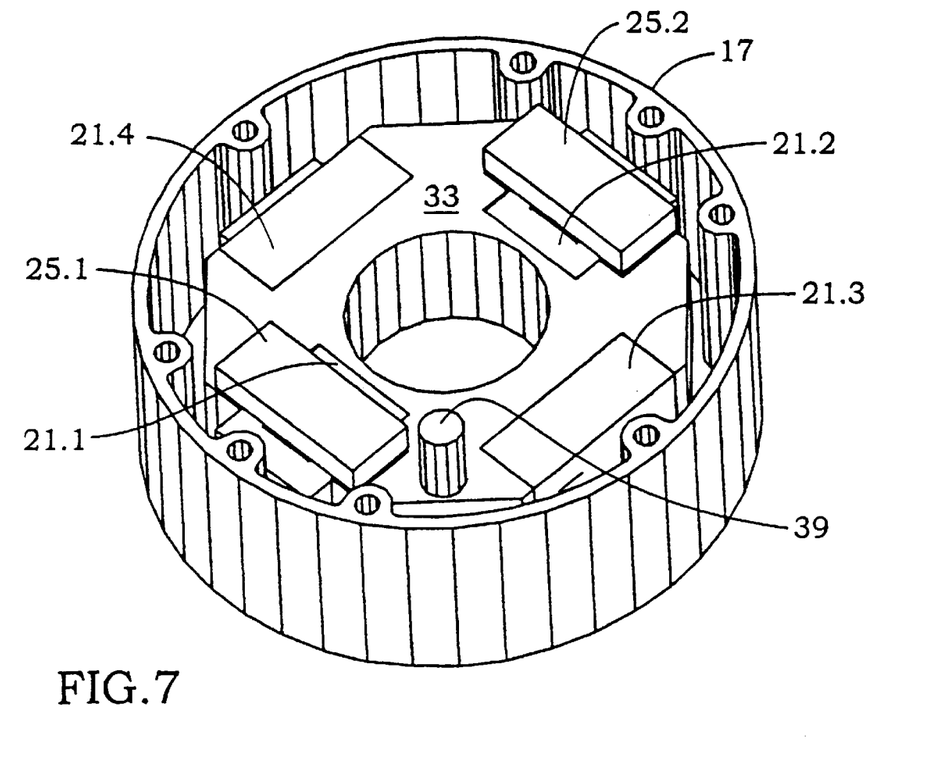
FIG. 7 is a perspective view of the FIG. 6 plate mounted in a cylindrical case.
Figure 8:
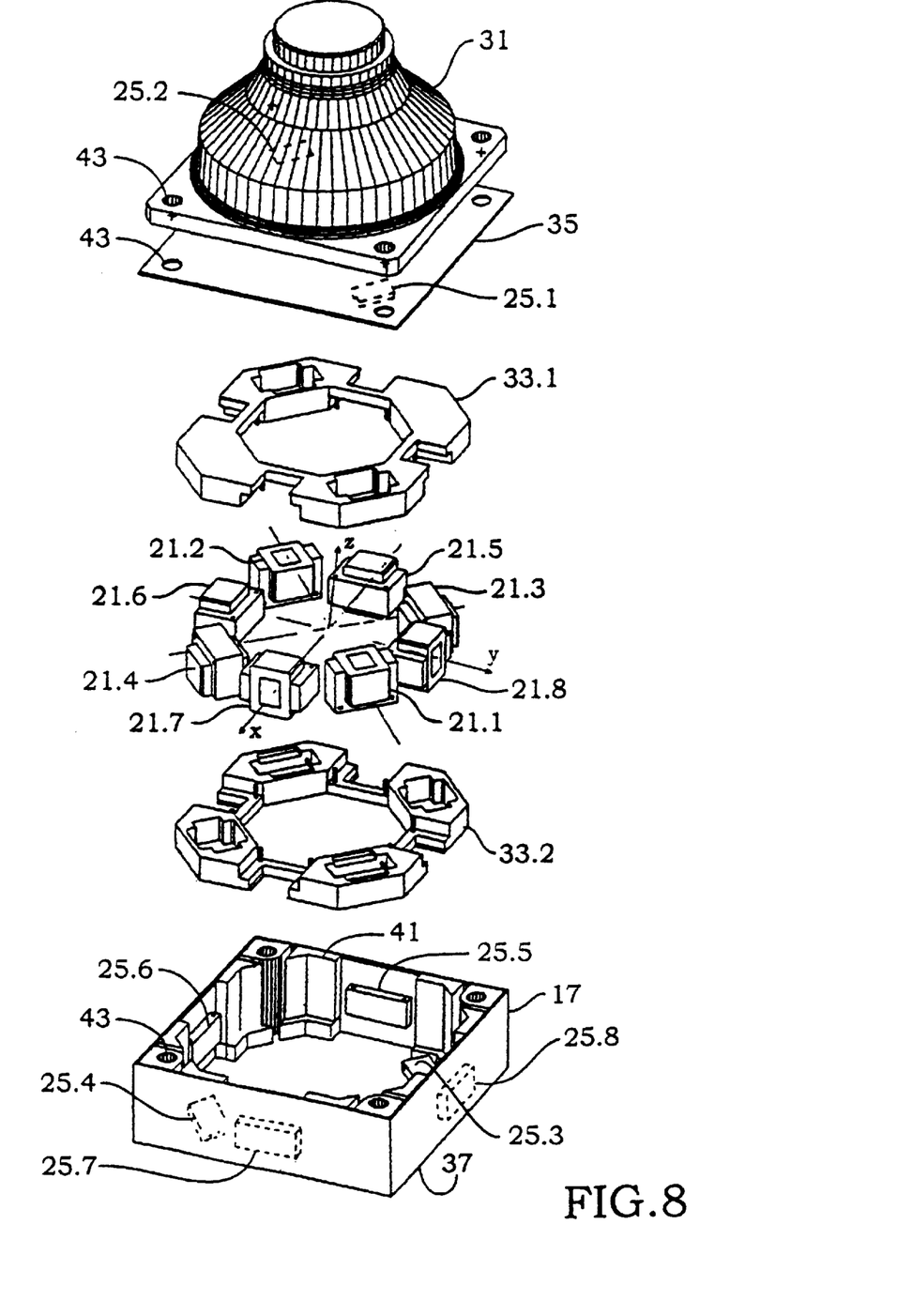
FIG. 8 is an exploded perspective view of a first preferred variant embodiment of the FIG. 4 motor of the present invention designed to be superposed on a support stud.
Figure 9:
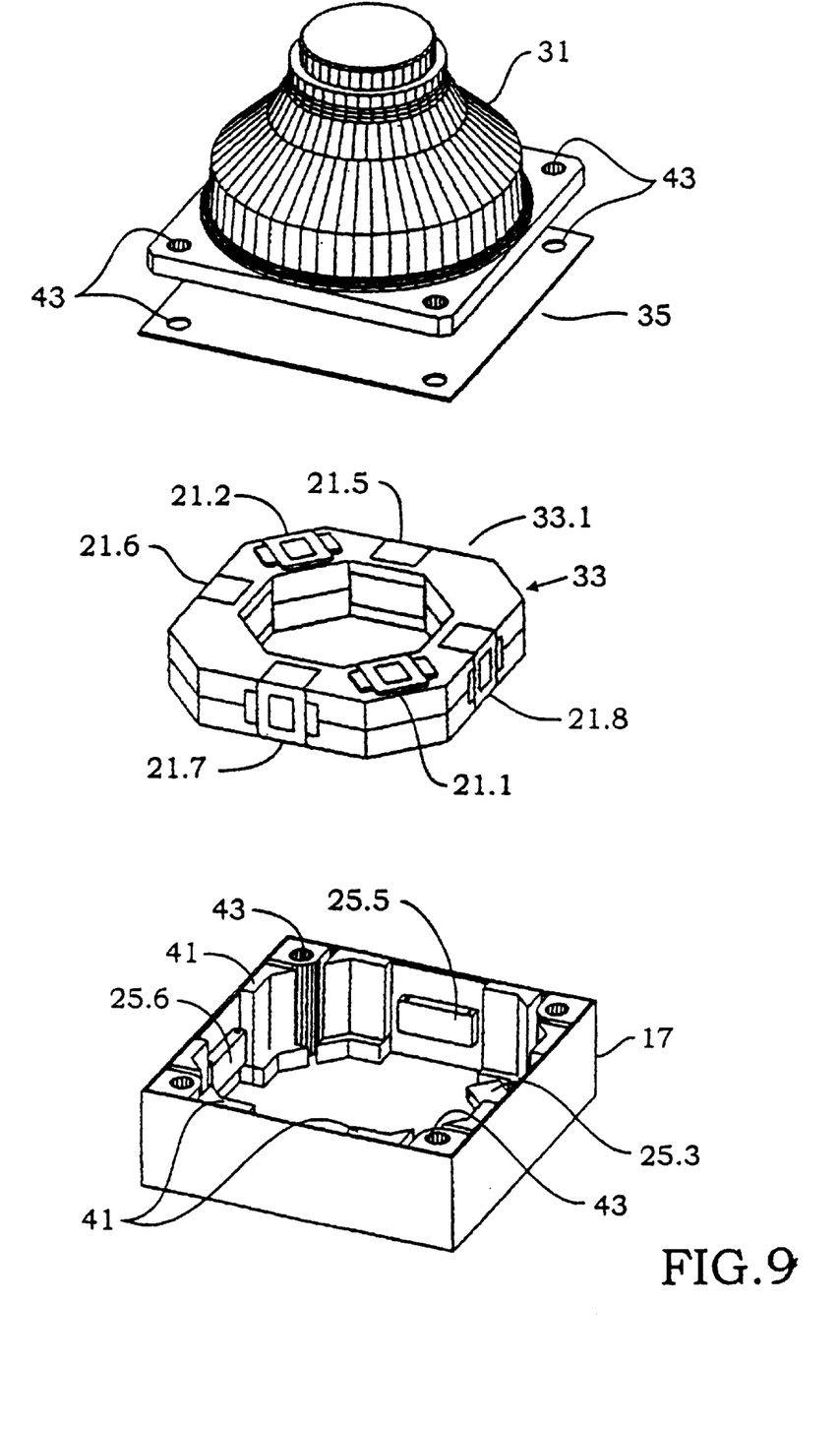
FIG. 9 is an analogous view of the FIG. 8 motor in which the actuator-carrier plate has been assembled.
Figure 10:
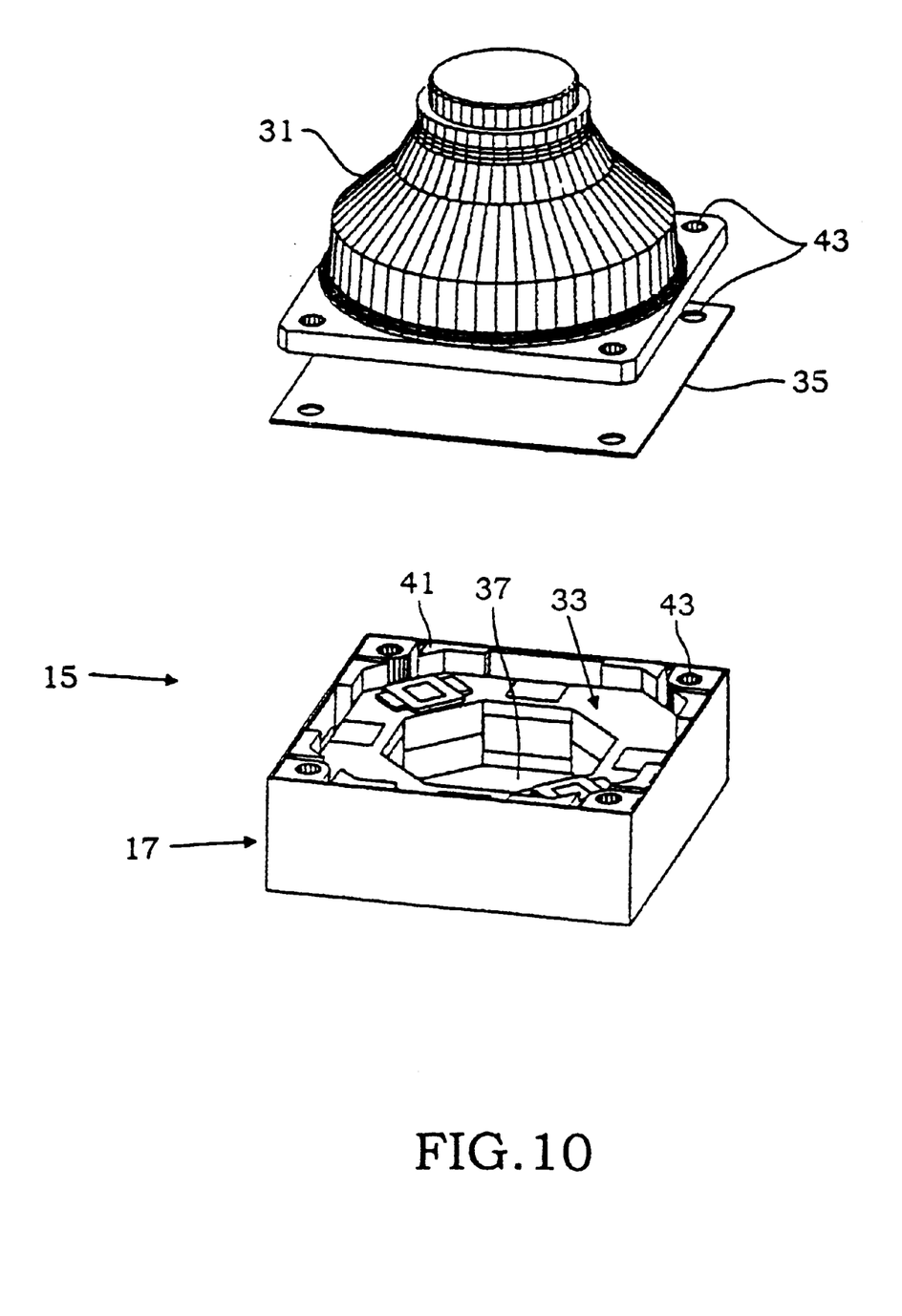
FIG. 10 is an analogous view of the FIG. 8 motor in which the plate is placed inside a housing.
Figure 11:
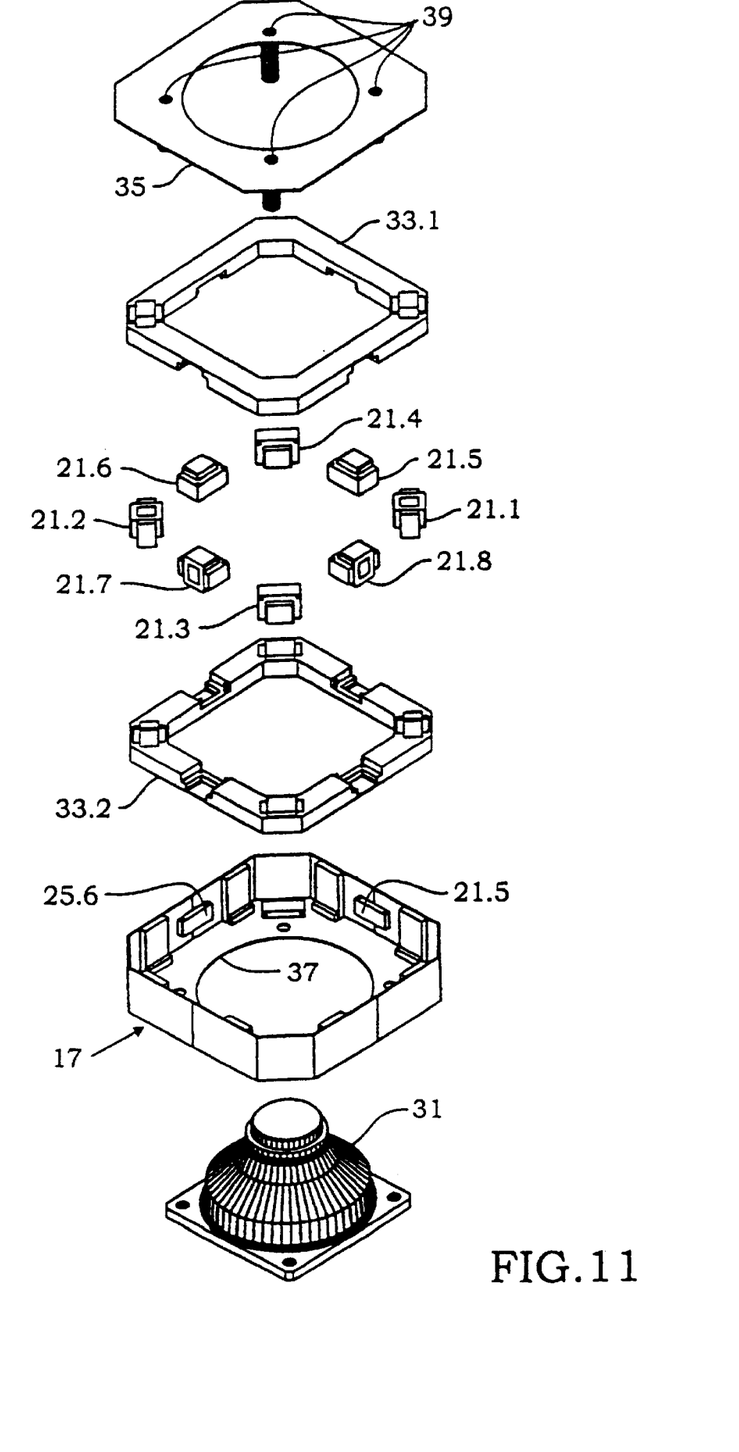
FIG. 11 is an exploded perspective view of a second preferred variant embodiment of the FIG. 4 motor of the present invention designed to be mounted externally around a support stud.
Figure 12:
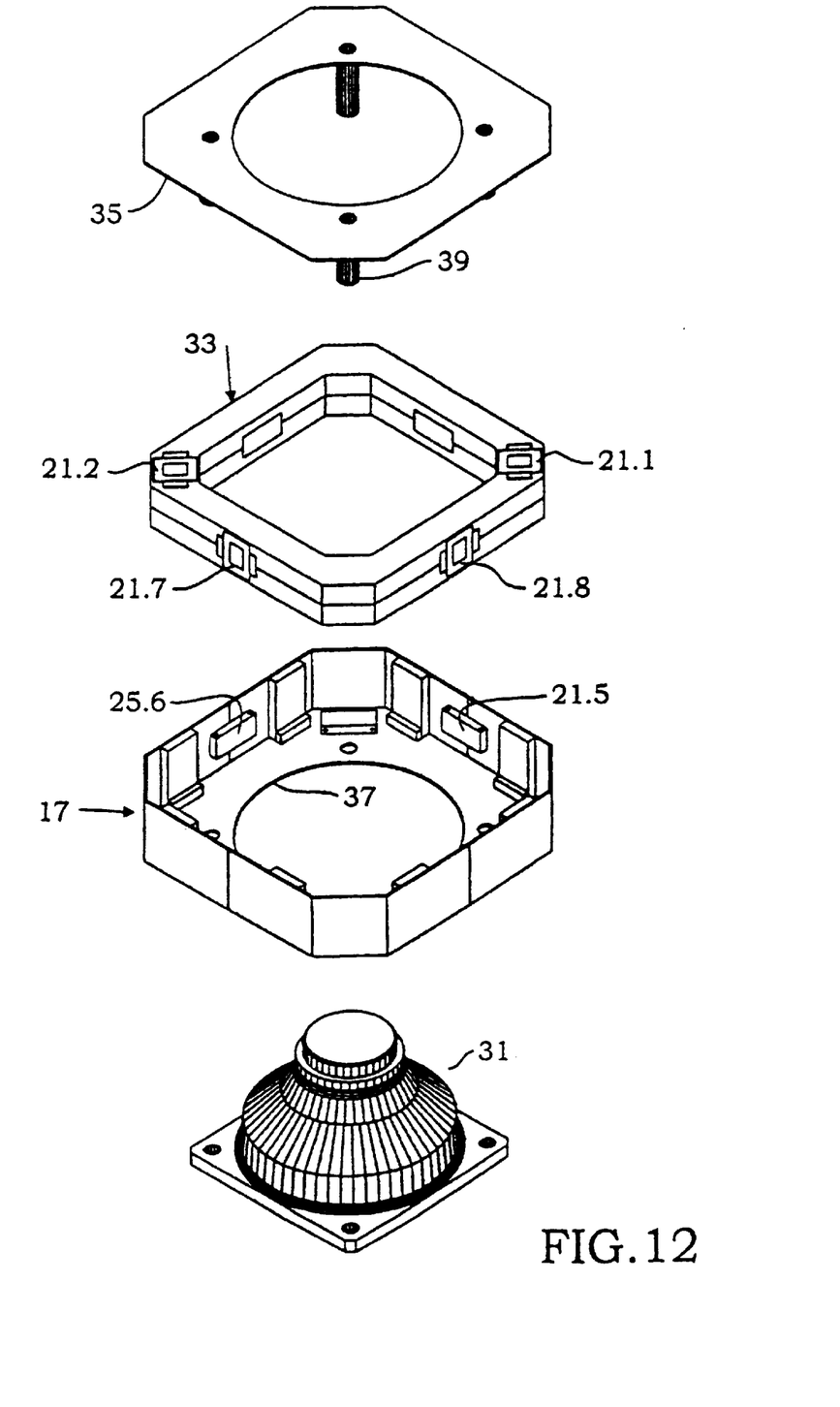
FIG. 12 is an analogous view of the FIG. 11 motor in which the actuator-support plate has been assembled.
Figure 13:
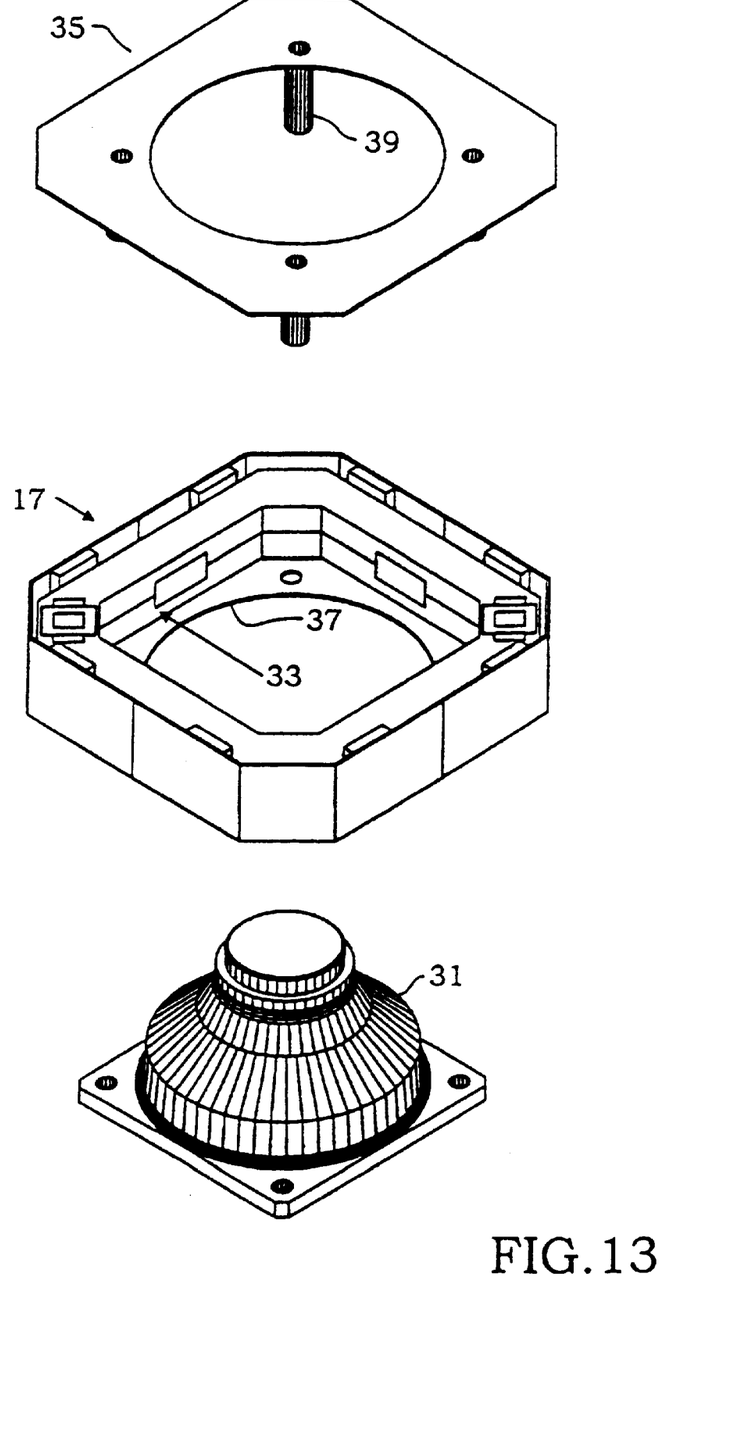
FIG. 13 is an analogous view of the FIG. 11 motor in which the actuator-support plate has been placed in its housing.
Figure 14:
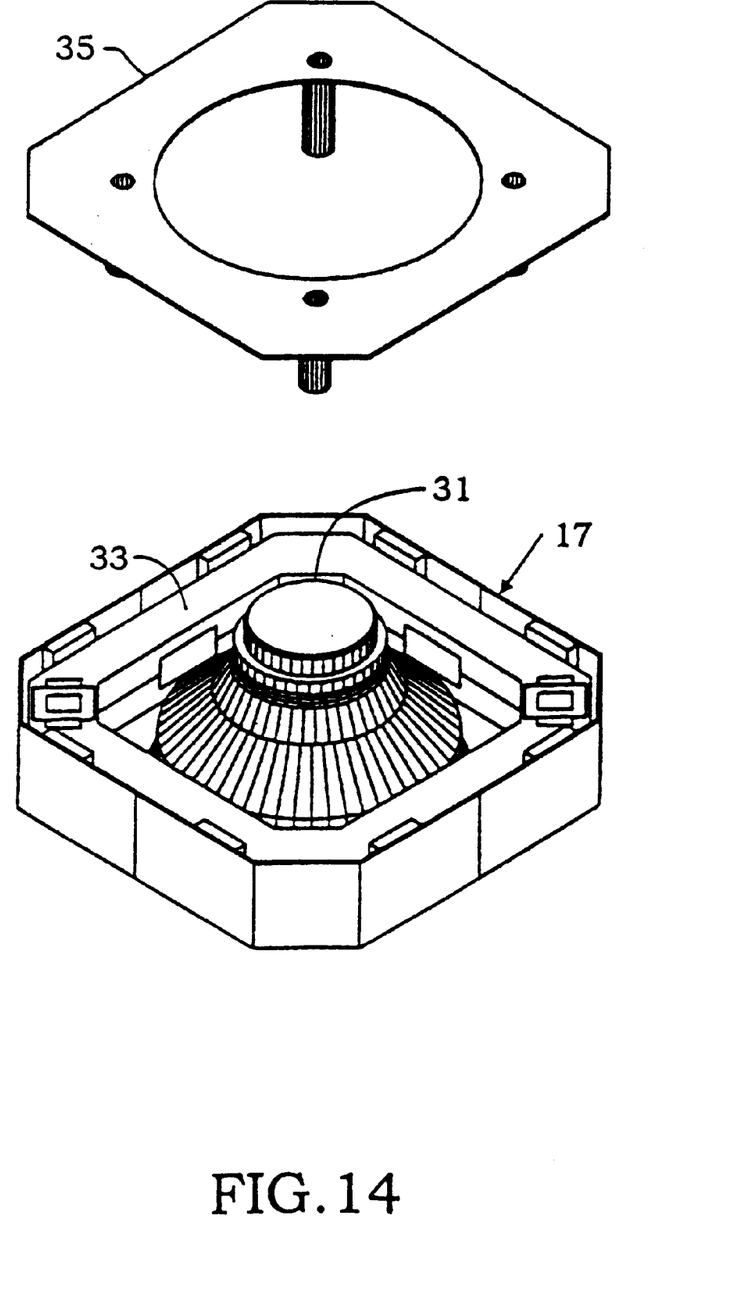
FIG. 14 is an analogous view of the FIG. 11 motor placed around a support stud.
Figure 15:
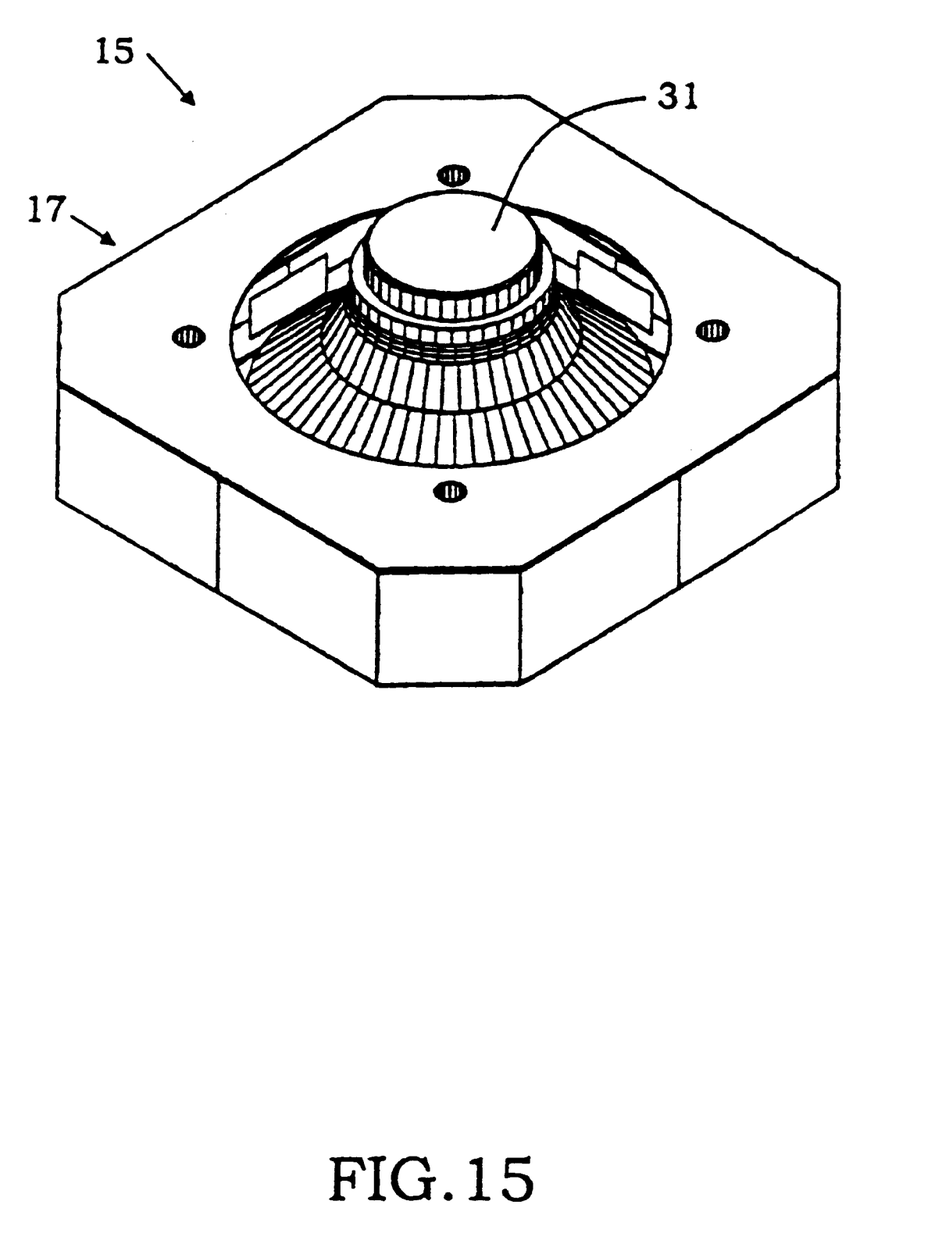
FIG. 15 is an analogous view of the FIG. 11 motor where the over has been put into place on the housing.

The motor of FIGS. 6 to 10 comprises a support plate 33 for supporting the electromagnetic actuators, the plate comprises a top element 33.1 and a bottom element 33.2 that are advantageously symmetrical about a horizontal plane. The plate 33 receives the actuators 21.1 to 21.8 with their axes disposed so as to make it possible on command to obtain the desired displacements. In the non-limiting example shown, the plate 33 is octagonal and has eight actuator-receiving recesses. By way of example, it is possible to use the magnetic circuits of transformers. The plate provided with the actuators (FIGS. 6, 7, 9, and 10) is placed in a cylindrical case (FIG. 7) or, advantageously, in a housing in the form of a square-based rectangular parallelepiped (FIGS. 8, 9, and 10). Pole plates 25.5, 25.6, 25.7, and 25.8 are secured to the vertical walls of the housing 17. Pole plates 25.1 and 25.2 are secured to a top closure plate 35 of the motor of the present invention. Pole plates 25.3 and 25.4 are secured to a bottom closure plate 37 of the motor of the present invention.

The housing 17 also receives suspension means for suspending the plate 33, e.g. four elastomer studs 39 (only one of which is shown in FIGS. 6 and 7) and/or resilient abutments 41 likewise made of elastomer. In a variant, the suspension can be obtained by means of springs, in particular steel springs. The actuators 21.1 to 21.8 are disposed between the two portions 33.1 and 33.2 of the plate 33 prior to being secured to one another. The assembled plate 33 is placed in the housing 17. The bottom and top plates, advantageously with a support plate for the stud 31, are assembled together, e.g. by bolts and nuts (not shown) passing through openings 43 disposed in the four corners of these elements. The assemblies comprising a motor 15 and a fixing stud 31 can then be secured to the support of the machine whose vibration is to be controlled. The machine is put into place and the necessary electrical connections are made.

In FIGS. 11 to 15, there can be seen a variant of the motor 15 of the present invention which has a central opening for receiving a stud 31. This central opening is provided both through the bottom plate 37, through the plate 33, and through the top plate 35. The vertical extent of the housing of the motor of the present invention as shown in FIGS. 12 to 15 is smaller than the height of the stud 31 so as to avoid any direct contact between the rotary or other machine whose vibration is to be eliminated and the motor 15 of the present invention. The motor of FIGS. 11 to 15 can easily be adapted to existing machines that are supported on studs. This implementation can be performed as follows. The machine whose vibration is to be eliminated is disconnected and removed, the studs are surrounded by the motors of the present invention, and the machine is put back into place on the studs surrounded by the motors of the present invention, and the necessary electrical connections are made.

In FIG. 16, there can be seen active vibration control apparatus of the present invention that is remarkable in that it has motors 15 of the present invention, e.g. motors such as those shown in FIGS. 6 to 10 of the present application. A machine 45, e.g. a motor, is supported by a floor 47 via four vibration damping studs 31, each of which is supported by a motor 15 of the present invention (only two can be seen in the Figure). In a variant (not shown), the motors 15 of FIGS. 11 to 15 surround the studs 31. A first vibration sensor 49 is placed on the machine 45 and a second vibration sensor 51 is placed on the floor 47. The sensors 49 and 51 are connected to a controller 53 that delivers control signals in real time to the various actuators of the motors 15, thereby creating vibrations of amplitude that are equal and opposite in phase to the vibrations generated by the operation of the machine 45. Advantageously, the control signals are applied via amplifiers 55.1 to 55.4 to the motors 15 concerned.

The present invention applies mainly to controlling vibrations, and is applicable in industry for suspending rotary machines, transformers, measuring machines, etc. It can also be used as a vibration generator for machines that use vibrators or for controlling a noise by generating vibrations in a structure suitable for emitting a noise in phase opposition.

What is claimed is:

1. An electromagnetic motor comprising a plurality of actuators, and having at least two actuators disposed side by side and alternately exerting forces in opposite directions, the motor including at least four parallel axis actuators, comprising two first actuators exerting a force in a first direction, and two other actuators exerting forces in the opposite direction.

2. A motor according to claim 1, wherein the two first actuators and the two other actuators are disposed symmetrically about the working axis of the actuator.

3. A motor according to claim 1, wherein said motor is a linear motor.

4. A motor according to claim 1, wherein the actuators are electromagnets.

5. A motor according to claim 1, including a plate receiving the various actuators and forming the inertial mass of the motor.

6. A motor according to claim 1, including actuators making it possible, on command, to displace the moving equipment along three orthogonal axes.

7. A motor according to claim 1, including a housing or case suitable for receiving a vibration-absorbing stud, and including means for fixing said stud.

8. A motor according to claim 1, including a central recess for receiving a vibration-absorbing stud.

9. Apparatus for active vibration control, the apparatus comprising a vibration sensor that acquires the vibrations to be eliminated, and controller means for generating actuator-control signals in real time, the apparatus including at least one motor according to claim 1 generating vibrations under the control of the controller means, which vibrations are equal in amplitude and opposite in phase relative to the vibrations that are to be controlled.

* * * * *